(12) United States Patent
Paul et al.

(10) Patent No.: US 10,340,841 B1
(45) Date of Patent: Jul. 2, 2019

(54) DUAL AXIS SOLAR PANEL TRACKING COMPLETE MECHANICAL ARRANGEMENT

(71) Applicant: GOVERNMENT COLLEGE OF TECHNOLOGY, TamilNadu (IN)

(72) Inventors: Immanuel John Samuel Paul, TamilNadu (IN); V. Gopalakrishnan, TamilNadu (IN)

(73) Assignee: GOVERNMENT COLLEGE OF TECHNOLOGY, TamilNadu (IN)

( * ) Notice: Subject to any disclaimer, the term of this patent is extended or adjusted under 35 U.S.C. 154(b) by 0 days.

(21) Appl. No.: 16/024,463

(22) Filed: Jun. 29, 2018

(30) Foreign Application Priority Data

Dec. 29, 2017  (IN) .............................. 201741047252

(51) Int. Cl.
*H02S 20/32* (2014.01)
*H02S 30/10* (2014.01)

(52) U.S. Cl.
CPC .............. *H02S 20/32* (2014.12); *H02S 30/10* (2014.12)

(58) Field of Classification Search
CPC  F24J 2/5201; F24J 2/523; F24J 2/5209; F24J 2/5232; F24J 2/5233; F24J 2/525; F24J 2/54; F24J 2/5403; F24J 2/5417; F24J 2/5431; F24J 2002/5482
See application file for complete search history.

(56) References Cited

U.S. PATENT DOCUMENTS 8,168,931 B1 * 5/2012 Thel ...................... F24S 30/452
250/203.4
2006/0054162 A1  3/2006 Romeo
2011/0041834 A1 * 2/2011 Liao ........................ G05D 3/105
126/605
2011/0174295 A1 * 7/2011 Clavijo Lumbreras ......................
F24S 30/452
126/605
2013/0153519 A1  6/2013 Ashmore et al.

FOREIGN PATENT DOCUMENTS

CN  204667199 U * 9/2015

OTHER PUBLICATIONS

English machine translation of Yu (CN 204667199 U) provided by the EPO. (Year: 2018).*

* cited by examiner

*Primary Examiner* — Devina Pillay
*Assistant Examiner* — Daniel P Malley, Jr.
(74) *Attorney, Agent, or Firm* — Innovation Capital Law Group, LLP; Vic Lin

(57) ABSTRACT

The present invention discloses a dual axis solar panel structure for photovoltaic (PV) panel which facilitates tracking of sunlight with minimum effort and power. The present invention comprises a base frame assembly (1), middle frame assembly (2) and a top frame assembly (3). The bearing arrangement is such that on mounting of the a middle frame assembly (2) on the base frame assembly (1), the entire axial load of the of the structure carrying the Photovoltaic (PV) panels is transmitted to the axial bearing/thrust bearing (8) and the radial load to the bush bearings (5). This arrangement facilitates operation of the daily movement/azimuth angle slewing drive (4) with a motor of less capacity resulting in savings in the power required for the daily movement/azimuth angle slewing drive (4).

15 Claims, 7 Drawing Sheets

DUAL AXIS SOLAR PANEL TRACKING COMPLETE MECHANICAL ARRANGEMENT

FIELD OF INVENTION

The present invention relates to a support structure for solar panel. More particularly, the present invention relates to a Dual axis solar panel structure for Photovoltaic (PV) panel which facilitates tracking of sunlight with minimum effort and power.

DESCRIPTION OF PRIOR ART

In recent years, renewable energy resource is preferred over the conventional energy for its pollution free environment. Among the various renewable energy resources, solar energy attains much interest for its compatibility according to the user applications. Photovoltaic (PV) cells are used to generate the solar energy from the Sun. However, obtaining the maximum power from the PV cell is quite challenging due to the factors such as PV cell efficiency and tracking the sun direction over the time and seasonal change in sun positions. The efforts are being made to improve the PV cell efficiency by choosing appropriate molecule structure of the materials and maintaining the temperature coefficient of the cell. The solar trackers are used to rotate the solar panel towards the position of the sun by minimizing the angle of incident between the incoming light and the solar panel. For tracking the sun position, single axis and dual axis solar panels are used. Single axis solar panel supports to follow the trajectory of the sun in one axis which is a daily path of the sun (mostly east-west/azimuth angle direction) and the second axis is fixed. However, dual axis solar panel tracks the sun in the two directions which are daily and seasonal movements of the sun (east-west and north-south/elevation angle).

Numerous publications reports that the performance benefit in case of single axis solar panels is around 30% and in case of double axis solar panels the performance benefit is around 40%. The best performance is achieved during the summer than the winter season due to the maximum irradiation. Further, the maximum solar power is obtained when we move away from the equator for dual axis solar panel. Generally, the solar trackers are integrated with sensors and electric motors that consume small amount of additional energy from the captured power. However, the amount of required energy for the operation of the solar tracker depends on the various factors such as number of panels, weight of the panels, structural weight, and wind force. This necessitates to optimize the design parameters of the solar panel that requires the fractional driving power.

Many inventions were made using the dual axis solar panels which addressed various issues in the solar tracker. US Publication No. US 2006-0054162 discloses a structure to support photovoltaic panels in which panels are arranged in spaced rows at different levels on two slopes to favor their ventilation and expansion of the frame freely. Further, most of the solar trackers were made horizontal support connected with top frame using two pivotal connections. However, these two pivotal connection divides the total panel and top frame assembly load equally which causes stress on the pivotal points. Therefore, this configuration is likely to worn out at the pivotal points.

US Publication No. US 2013-0153519 discloses a structure to support photovoltaic panels in which the horizontal frame is connected to a single pivotal point, which would lead to inclination of the horizontal frame on the both frame ends.

It will be advantageous to have a dual axis solar panel structure to support the Photovoltaic (PV) panels provided with drive system for tracking which consumes very less power.

OBJECTS OF INVENTION

One or more of the problems of the conventional prior art may be overcome by various embodiments of the present invention.

It is the primary object of the present invention to provide a Dual axis solar panel structure for Photovoltaic (PV) panels, which facilitates tracking of sunlight with minimum effort and power.

It is another object of the present invention to provide a Dual axis solar panel structure comprising a base frame assembly comprises a base plate fitted with a base vertical tube.

It is another object of the present invention to provide a Dual axis solar panel structure comprising middle frame assembly having a middle frame fitted with bearings to pivotally support the top frame assembly.

It is another object of the present invention to support the middle frame by an axial bearing/thrust bearing at the base frame assembly to take the axial load of the structure carrying the plurality of Photovoltaic (PV) panels.

It is another object of the present invention to support the middle frame with plurality of split type bush bearings separated by spacers for the distribution of the radial load of the structure carrying the Photovoltaic (PV) panels.

It is another object of the present invention, wherein the middle frame of the middle frame assembly is made of T cross section steel beam.

It is another object of the present invention, wherein plurality of split type bearing blocks with bearing made of antifriction material such as gunmetal are mounted on the middle frame of the middle frame assembly to support the oscillatory motion of the top frame assembly.

It is another object of the present invention, wherein the top frame assembly comprises one or more trusses and C-frames.

It is another object of the present invention, wherein one or more drive arrangement is mounted on the middle frame assembly to provide the oscillatory motion to the top frame assemblies It is another object of the present invention, wherein the top frame assembly are disposed to carry the Photovoltaic (PV) panels.

SUMMARY OF INVENTION

Thus, according to the embodiment of the present invention there is provided a dual axis solar panel tracking complete mechanical arrangement comprising a base frame assembly, a middle frame assembly, a top frame assembly, one or more photovoltaic (PV) panels, a daily movement/azimuth angle slewing drive and one or more seasonal movement/elevation angle slewing drive.

It is another aspect of the present invention, wherein the base frame assembly comprises a base plate fitted with a base vertical tube.

It is another aspect of the present invention, wherein one or more bush bearings are fitted to base vertical tube for the distribution of the radial load of the structure comprising the Photovoltaic (PV) panels mounted on the top frame assembly fitted to the middle frame assembly.

It is another aspect of the present invention, wherein the upper end of the base vertical tube is closed by a thrust bearing mounting plate to mount an axial bearing/thrust bearing to transmit the entire axial load of the structure comprising the Photovoltaic (PV) panels mounted on the top frame assembly fitted to the middle frame assembly.

It is another aspect of the present invention, wherein the middle frame assembly comprises a tube assembly having tube with inside diameter suitable to provide close sliding fit with the bush bearings mounted on the base vertical tube.

It is another aspect of the present invention, wherein the upper end of the tube is closed by a steel plate, the bottom portion of which rests on the axial bearing/thrust bearing on mounting of the middle frame assembly on the base frame assembly.

It is another aspect of the present invention, wherein a mounting flange is rigidly fitted at the lower end of the tube to connect the middle frame assembly with the daily movement/azimuth angle slewing drive fitted on the base frame assembly fitted with a flange.

It is another aspect of the present invention, wherein plurality of bearing blocks with bearing are mounted on the middle frame of the middle frame assembly to support the oscillatory motion of the top frame assembly.

It is another aspect of the present invention, wherein the top frame assembly is constructed with one or more trusses fitted with plurality of C-frames and are detachably mounted on tubular longitudinal member.

It is another aspect of the present invention, wherein drive coupling flange is fitted at the drive end of the tubular longitudinal member to drivingly connect the top frame assembly to the seasonal movement/elevation angle slewing drive.

It is another aspect of the present invention, wherein the top frame assembly support the Photovoltaic (PV) panels.

It is another aspect of the present invention, wherein the motors of the daily movement/azimuth angle slewing drive and seasonal movement/elevation angle slewing drive are connected to a control arrangement to provide required oscillatory movement to the middle frame assembly and the top frame assembly carrying the Photovoltaic (PV) panels.

It is another aspect of the present invention, wherein the bush bearings are split type construction and made of material bronze, Phosphor bronze.

It is another aspect of the present invention, wherein the bush bearings are provided with one or more radial holes through which the lubricant is applied.

It is another aspect of the present invention, wherein the bush bearings are separated by one or more spacer ring.

It is another aspect of the present invention, wherein upper end of the base vertical tube is closed by a thrust bearing mounting plate.

It is another aspect of the present invention, wherein middle frame assembly comprises a tube assembly, two middle frames, two middle frame supports and a mounting flange.

It is another aspect of the present invention, wherein flange of the base vertical tube as well as mounting flange of the middle frame assembly are provided with radial fixing holes for fixing the daily movement/azimuth angle slewing drive.

It is another aspect of the present invention, wherein the middle frame is made of 'I' cross section steel beam.

It is another aspect of the present invention, wherein the bearing blocks are of split type construction and fitted with bearing made of antifriction material such as gunmetal.

It is another aspect of the present invention, wherein the seasonal movement/elevation angle slewing drive is mounted on a drive bracket which is detachably fitted at least at one of the outer ends of the middle frame.

DETAILED DESCRIPTION OF THE INVENTION WITH REFERENCE TO THE ACCOMPANYING DRAWINGS

The invention is directed towards a Dual axis for Photovoltaic (PV) panel which facilitates tracking of sunlight with minimum effort and power.

Figure 1:
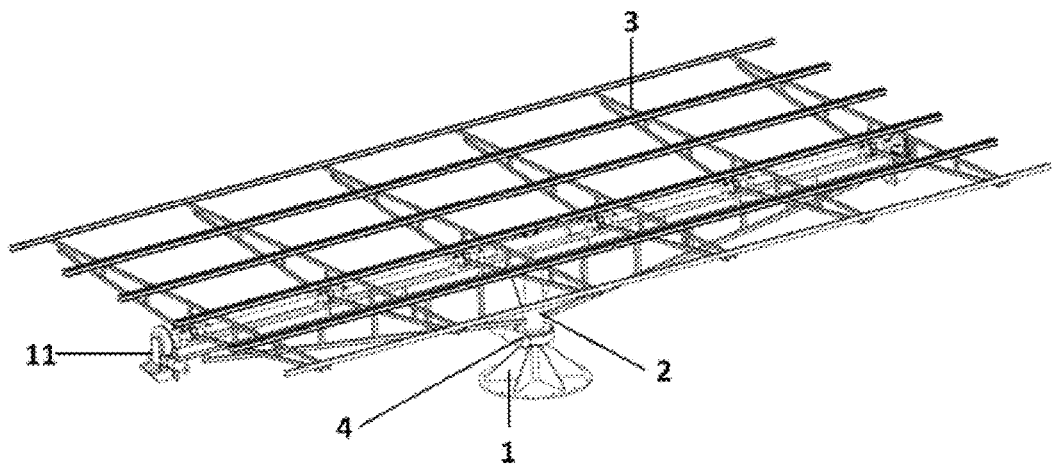
FIG. 1: schematically illustrates the perspective view of the Dual axis solar panel structure according to the present invention.
Figure 2:
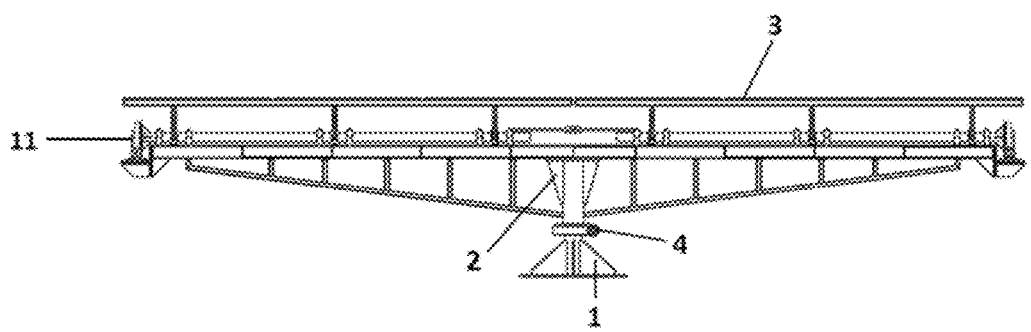
FIG. 2: schematically illustrates the front view of the Dual axis solar panel structure according to the present invention mounted with Photovoltaic (PV) panel.
Figure 3:
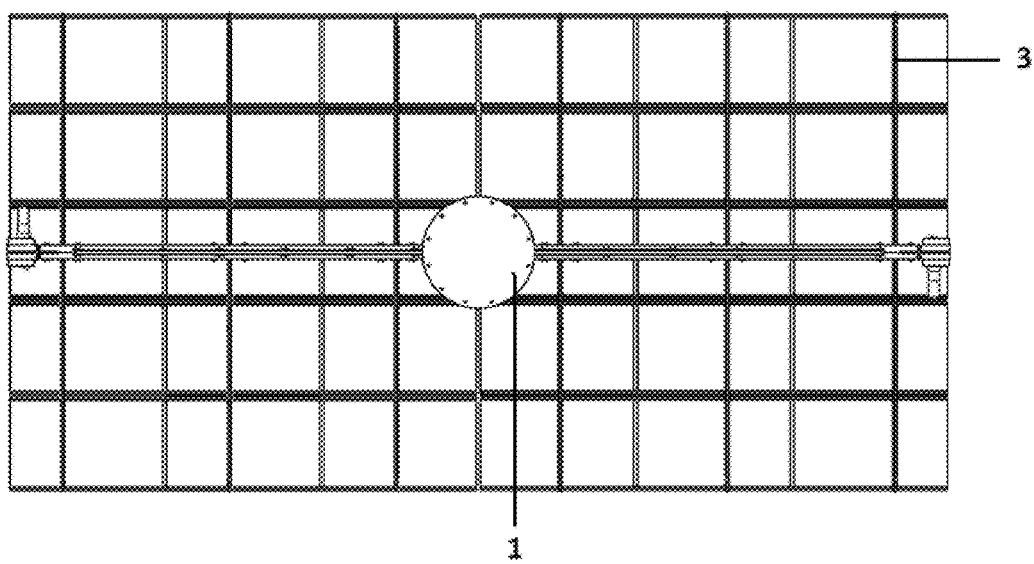
FIG. 3: schematically illustrates the bottom view of the Dual axis solar panel structure according to the present invention mounted with Photovoltaic (PV) panel.

As shown in FIGS. 1 and 2 the support structure for solar panel comprises a base frame assembly (1), middle frame assembly (2) and a top frame assembly (3).

Figure 6:
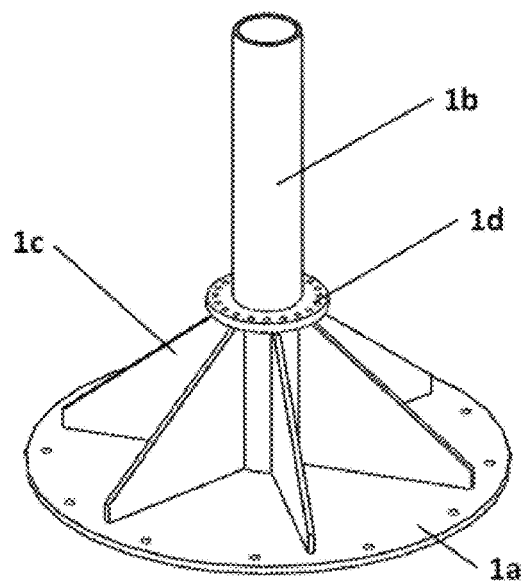
FIG. 6: schematically illustrates the base frame assembly according to the present invention.
Figure 7:
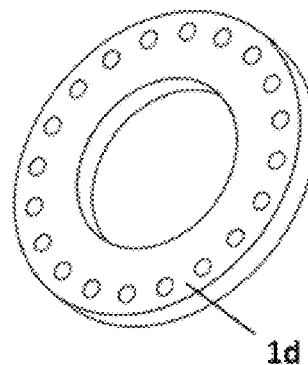
FIG. 7: schematically illustrates flange of the base frame assembly according to the present invention.

As shown in FIG. 6 the base frame assembly (1) comprises a base plate (1a) fitted with a base vertical tube (1b). The base plate (1a) is made of steel plate of suitable size, shape and thickness which is selected according to number of Photovoltaic (PV) panels that are to be supported by the structure. The base vertical tube (1b) is made of seamless steel tube of suitable thickness which is selected according to number of Photovoltaic (PV) panels that are to be supported by the structure. The lower end of the of the base vertical tube (1b) is open and is rigidly fitted to the base plate (1a) for example by welding such that the closed end extends in a direction perpendicular to the base. In order to enhance the stability and rigidity, the base plate (1a) and the base vertical tube (1b) and are rigidly supported by plurality of strengthening ribs (1c) for example by welding. While the vertical wall of the strengthening ribs (1c) are welded on the periphery of the base vertical tube (1b), the horizontal wall of the strengthening ribs (1c) are welded on the upper side of the base plate (1a). A flange (1d) with plurality of radial fixing holes made of steel plate of required thickness is rigidly fitted at the bottom portion of the base vertical tube (1b) above the strengthening ribs (1c) for fixing the Daily movement/azimuth angle Slewing Drive (4) having at least one drive motor.

Figure 5:
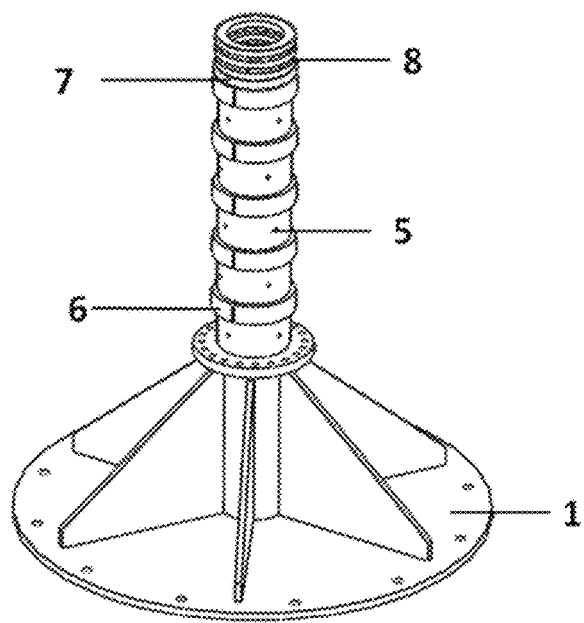
FIG. 5: schematically illustrates the base assembly of the Dual axis solar panel structure fitted with the bearings according to the present invention.
Figure 8:
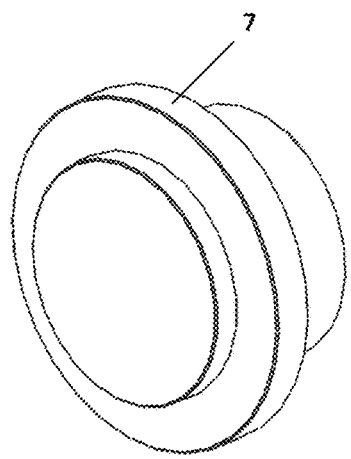
FIG. 8 schematically illustrates the thrust bearing mounting plate according to the present invention.

As shown in FIG. 5 one or more bush bearings (5) are fitted to base vertical tube (1b) which are separated by one or more spacer ring (6) for the distribution of the radial load of the structure carrying the Photovoltaic (PV) panels. The bush bearings (5) are split type construction for easy mounting and made of material such as bronze, Phosphor bronze. The bush bearings (5) are provided with one or more radial holes through which the lubricant is applied. The spacer ring (6) is made of seamless steel tubes and placed in between the bush bearings (5). The upper end of the base vertical tube (1b) is closed by a thrust bearing mounting plate (7) shown in FIG. 8. The thrust bearing mounting plate (7) which is made of metallic material for example stainless steel. The bottom end of thrust bearing mounting plate (7) is inserted in the upper end of the base vertical tube (1b) and an axial bearing/thrust bearing (8) is mounted on the upper end the thrust bearing mounting plate (7) as shown in FIG. 5. The bearing arrangement is such that on mounting of the a middle frame assembly (2) on the base frame assembly (1), the entire axial load of the of the structure carrying the Photovoltaic (PV) panels is transmitted to the axial bearing/thrust bearing (8) and the radial load to the bush bearings (5).

Figure 10:
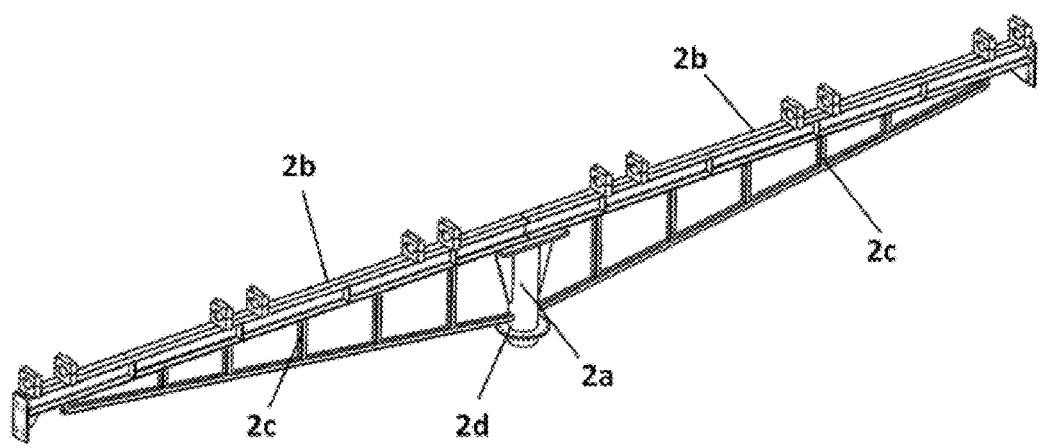
FIG. 10 schematically illustrates the middle frame assembly fitted with bearing blocks according to the present invention.

As shown in FIG. 10 the middle frame assembly (2) comprises a tube assembly (2a), two middle frames (2b), two middle frame supports (2c) and a mounting flange (2d).

Figure 12:
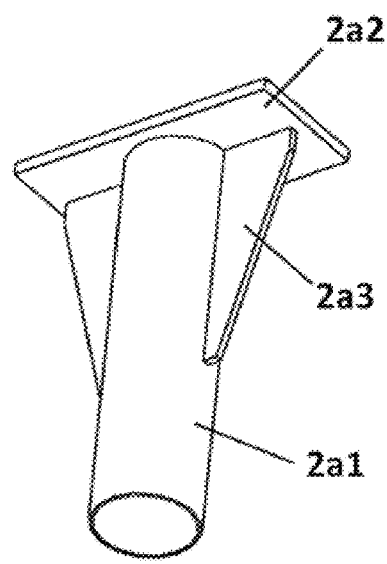
FIG. 12 schematically illustrates the tube assembly of the middle frame assembly according to the present invention.
Figure 13:
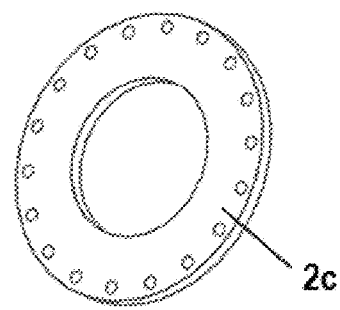
FIG. 13 schematically illustrates the mounting flange according to the present invention.

As shown in FIG. 12 the tube assembly (2a) comprises a tube (2a1) made of seamless steel having inside diameter suitable to provide close sliding fit with the bush bearings (5) mounted on the base vertical tube (1b). The upper end of the tube (2a1) is closed by a steel plate (2a2) the bottom portion of which rests on the axial bearing/thrust bearing (8) on mounting of the middle frame assembly (2) on the base frame assembly (1). To enhance the stability plurality of strengthening ribs (2a3) are fitted between tube (2a1) and steel plate (2a2). While the vertical wall of the strengthening ribs (2a3) are welded on the periphery of the tube (2a1), the horizontal wall of the strengthening ribs (2a3) are welded on the bottom side of the steel plate (2a2).

Figure 11:
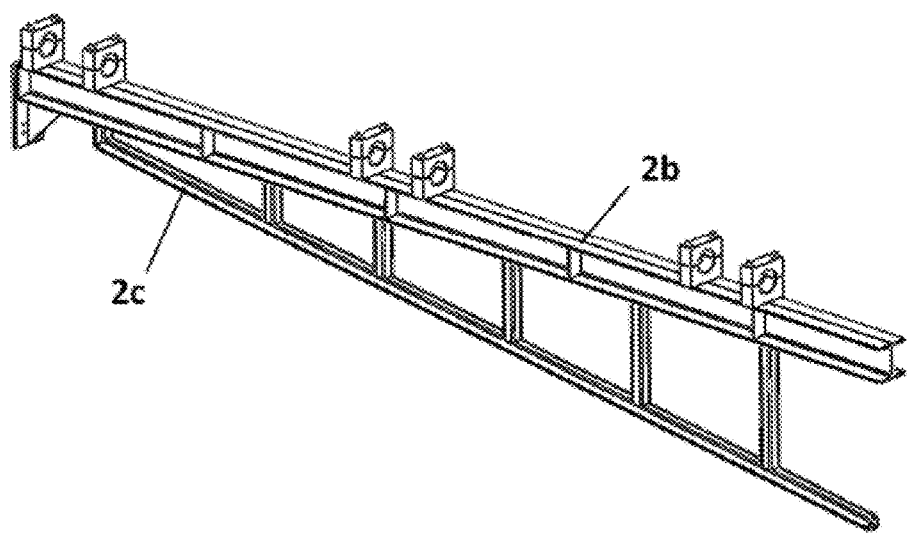
FIG. 11 schematically illustrates partial view of the middle frame assembly showing the middle frame in detail.

As shown in FIGS. 10 and 11 the middle frames (2b) are kept on the upper side of the steel plate (2a2) of the tube assembly (2a) and welded. The middle frame (2b) is made of 'I' cross section steel beam. To provide sufficient stiffness, the middle frame and the tube assembly are connected by middle frame supports (2c) constructed in the form of truss using tubular steel material and welded to the middle frames (2b) and the tube assembly (2a).

The mounting flange (2d) made of steel plate having plurality of radial fixing holes is rigidly fitted at the lower end of the tube (2a1) for example by welding to connect the middle frame assembly (2) with the daily movement/azimuth angle Slewing Drive (4) fitted on the base frame assembly (1) as shown in FIGS. 1 and 2.

The entire space between the vertical tube (1b) of the base assembly (1) and tube (2a1) of the tube assembly (2a) of the middle frame assembly (2) is filled with lubricants.

Figure 9:
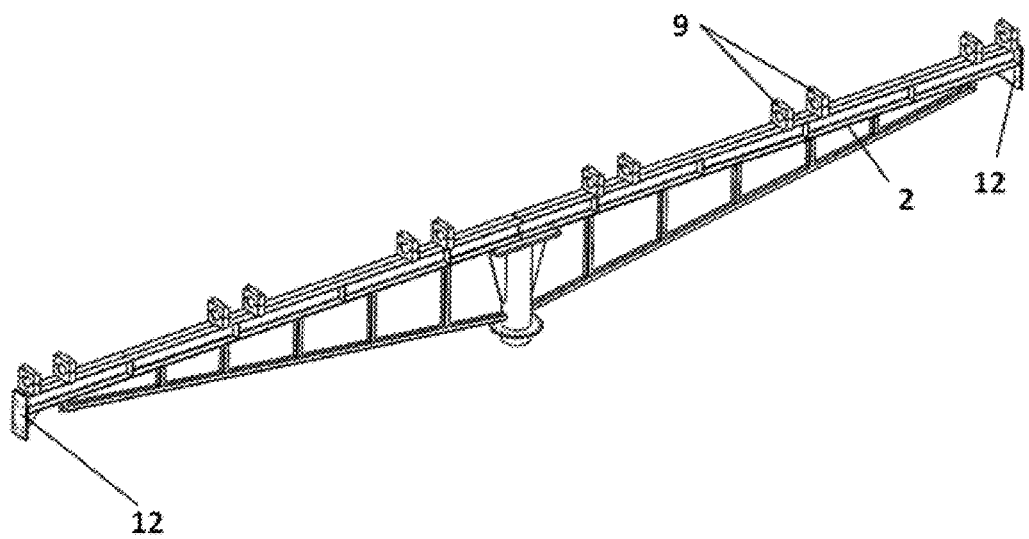
FIG. 9 schematically illustrates the middle frame assembly according to the present invention.

As shown in FIG. 9 plurality of bearing blocks (9) fitted with bearing made of antifriction material such as gunmetal are mounted on the middle frame (2b) of the middle frame assembly (2) to support the oscillatory motion of the top frame assembly (3). The bearing blocks (9) are of split type construction to facilitate easy mounting and dismounting of the top frame assembly (3) that are pivotally mounted in the bearing blocks (9).

Figure 14:
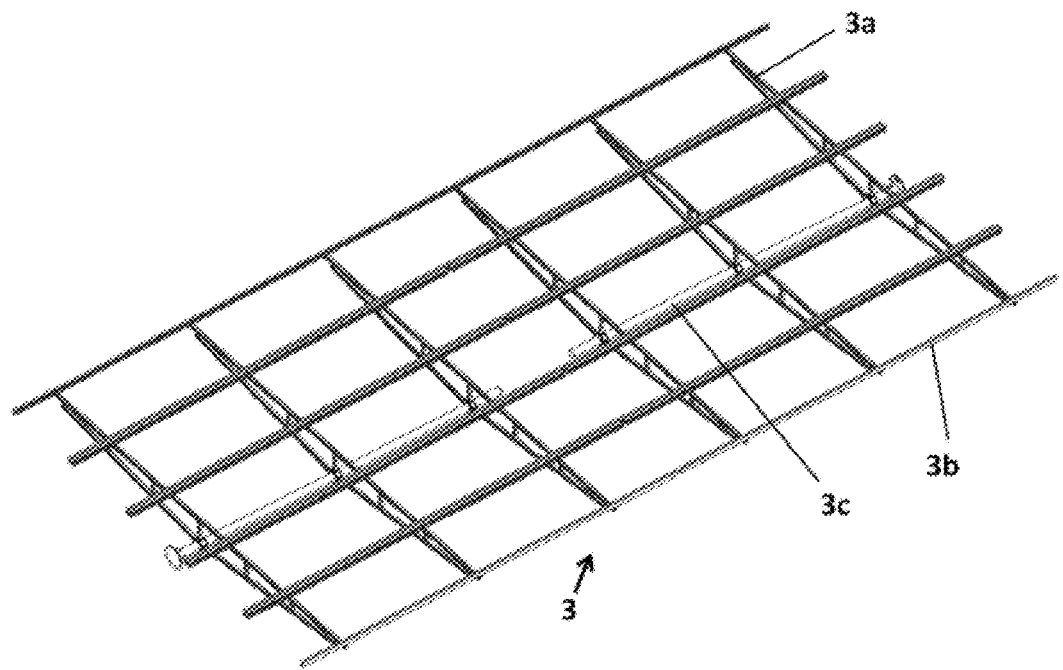
FIG. 14 schematically illustrates the top frame assembly according to the present invention.
Figure 15:
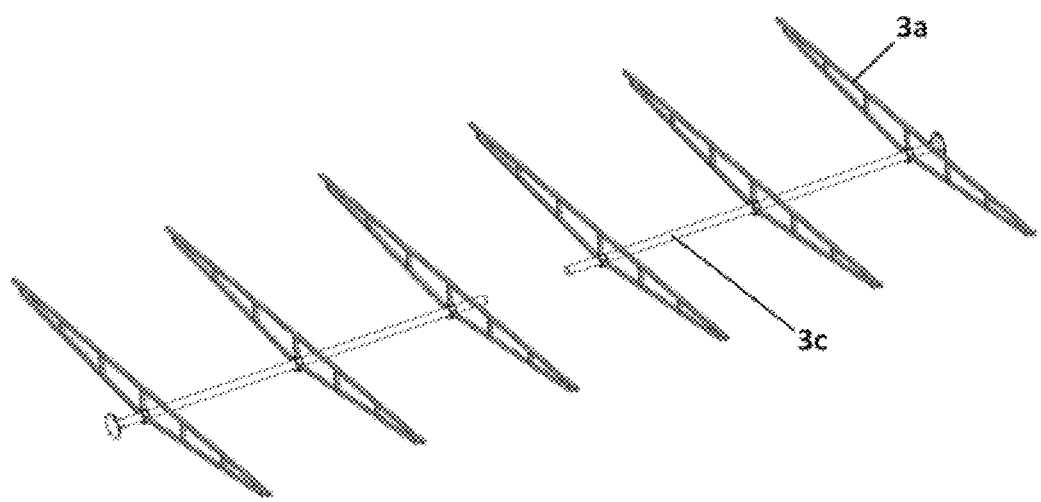
FIG. 15 schematically illustrates the trusses of the top frame assembly shown fitted with the tubular longitudinal member according to the present invention.
Figure 16:
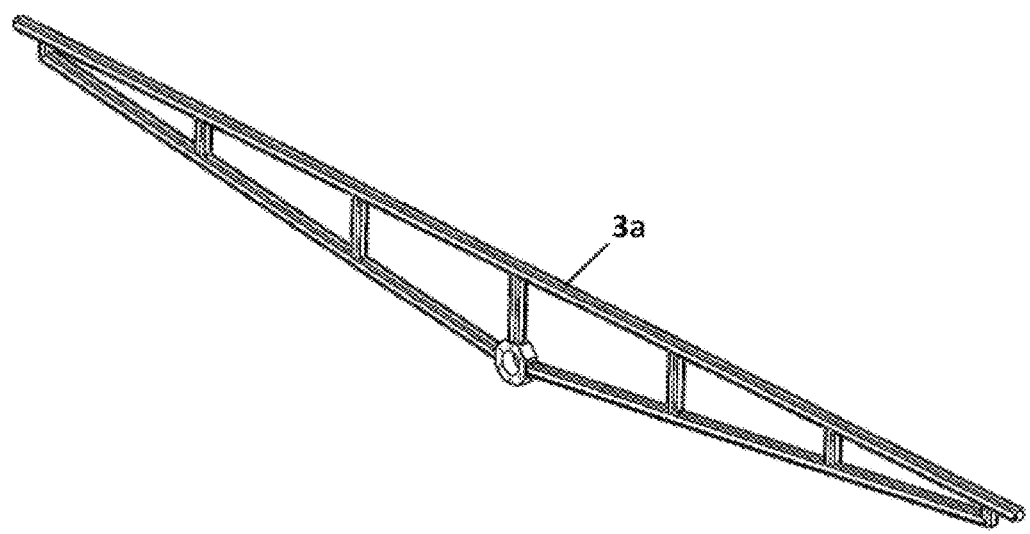
FIG. 16 schematically illustrates trusses of the top frame assembly according to the present invention.

As shown in FIG. 14 the top frame assembly (3) is constructed with one or more trusses (3a) fitted with plurality of C-frames (3b) and are detachably mounted on tubular longitudinal member (3c) made of steel. As shown in FIG. 16 the trusses (3a) are constructed with steel sections. The C-frames (3b) are constructed using 'C' profiled sheets of suitable thickness to facilitate easy mounting and dismounting of the Photovoltaic (PV) panel. The trusses (3a) of the top frame assembly (3) comprises split type hub having cylindrical bore for easy mounting and dismounting of the tubular longitudinal member (3c).

Figure 17:
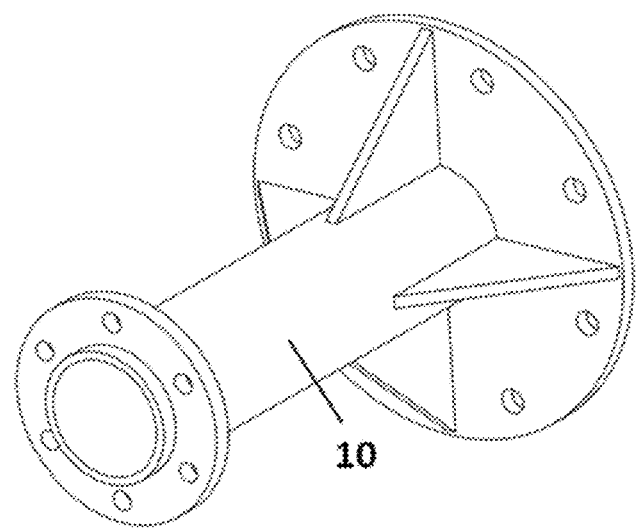
FIG. 17 schematically illustrates drive coupling flange that connects the top frame assembly and the seasonal movement/elevation angle slewing drive according to the present invention.

A drive coupling flange (10) shown in FIG. 17 has a smaller end and a bigger end, while the smaller end is fitted at the drive end of the tubular longitudinal member (3c), the seasonal movement/elevation angle slewing drive (11) is connected at the bigger end. The drive coupling flange (10) is provided to drivingly connect the top frame assembly (3) to the Seasonal movement/elevation angle slewing Drive (11) having atleast one drive motor. In a preferred embodiment there is provided two top frame assembly (3) and are connected to two Seasonal movement/elevation angle slewing Drive (11) to minimize the load due to possible deflection of the tubular longitudinal member (3c).

As shown in FIG. 9 a drive bracket (12) which is of 'L' shape construction is fabricated using steel angles and is detachably mounted at least at one of the outer ends of the middle frame (2) for mounting the Seasonal movement/elevation angle slewing Drive (11).

Figure 4:
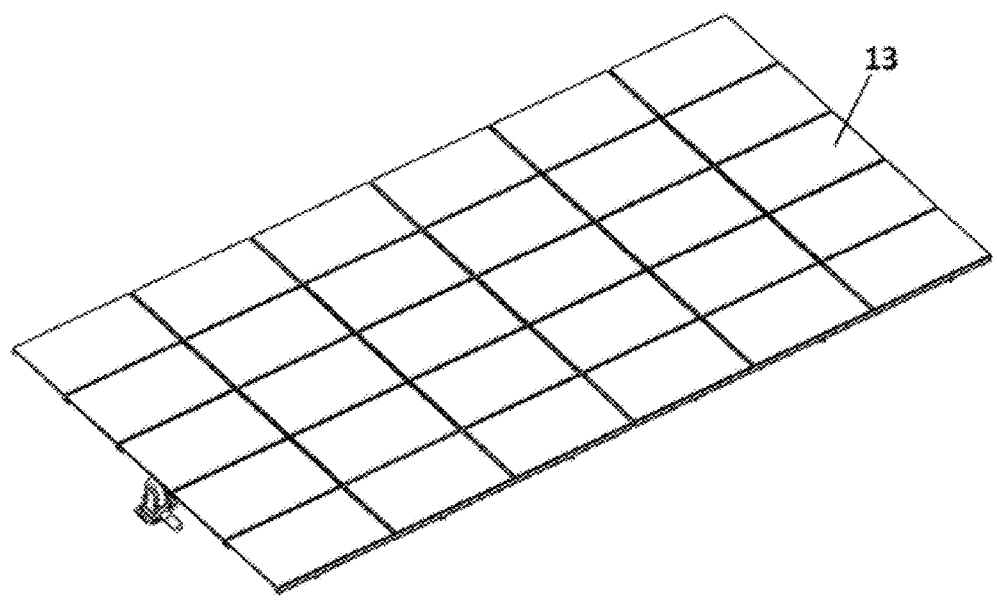
FIG. 4: schematically illustrates the top view of the Dual axis solar panel structure according to the present invention mounted with Photovoltaic (PV) panel.

As shown in FIG. 4 the Photovoltaic (PV) panels (13) are mounted on the top frame assembly (3) in the known method. The drive motors of the Daily movement/azimuth angle Slewing Drive (4) and Seasonal movement/elevation angle slewing Drive (11) are connected to a control arrangement to provide required oscillatory movement to the middle frame assembly (2) and the top frame assembly (3) carrying the Photovoltaic (PV) panels.

ADVANTAGEOUS OF THE PRESENT INVENTION

The construction is in a manner the distribution of the entire radial load of the structure comprising the Photovoltaic (PV) panels mounted on the top frame assembly (3) fitted to the middle frame assembly (2) through the tube (2a1)) of the tube assembly (2a) to the base vertical tube (1b) of the base assembly (1) through bush bearings (5).

Like wise the entire axial load of the of the structure comprising the Photovoltaic (PV) panels mounted on the top frame assembly is transmitted to axial bearing/ thrust bearing (8) mounted on the upper end of the base vertical tube (1b) of the base assembly (1) through the bottom portion of the steel plate (2a2) of the middle frame assembly (2)

This arrangement facilitates operation of the daily movement/azimuth angle slewing drive (4) with a motor of less capacity resulting in savings in the power required for the daily movement/azimuth angle slewing drive (4).

Since the top frame assembly is constructed as modules and are provided with plurality of tubular longitudinal member (3c) of shorter lengths, the deflection of the tubular longitudinal member (3c) and the associated problem in the seasonal drive arrangement in eliminated. Since the longitudinal member (3c) of the a top frame assembly (3) is pivotally supported in the bush bearings mounted in the plurality of bearing blocks (9), smooth oscillatory motion to the top frame assembly (3) mounted with the Photovoltaic (PV) panels is ensured.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. It is therefore, contemplated that the claims will cover any such modifications or embodiments that fall within the true scope of the invention.

We claim:

1. A dual axis solar panel tracking complete mechanical arrangement comprising:
    a base frame assembly (1);
    a middle frame assembly (2), wherein the middle frame assembly (2) comprises a tube assembly (2a), two middle frames (2b), two middle frame supports (2c) and a mounting flange (2d);
    a top frame assembly (3);
    one or more photovoltaic (PV) panels;
    a first slewing drive (4); and
    one or more second slewing drives (11);
    wherein the base frame assembly (1) comprises a base plate (1a) fitted with a base vertical tube (1b),
    wherein one or more bush bearings (5) are fitted to the base vertical tube (1b) for the distribution of the radial load of the structure comprising the photovoltaic (PV) panels mounted on the top frame assembly (3) fitted to the middle frame assembly (2),
    wherein the upper end of the base vertical tube (1b) is closed by a thrust bearing mounting plate (7) to mount a thrust bearing (8) to transmit the entire axial load of the structure comprising the photovoltaic (PV) panels mounted on the top frame assembly (3) fitted to the middle frame assembly (2),
    wherein the middle frame assembly (2) comprises a tube assembly (2a) having tube (2a1) with inside diameter providing a sliding fit with the bush bearings (5) mounted on the base vertical tube (1b),
    wherein the upper end of the tube (2a1) is closed by a steel plate (2a2), the bottom portion of which rests on the thrust bearing (8) on mounting of the middle frame assembly (2) on the base frame assembly (1),
    wherein a mounting flange (2d) is rigidly fitted at the lower end of the tube (2a1) to connect the middle frame assembly (2) with the first slewing drive (4) fitted on the base frame assembly (1) fitted with a flange (1d),
    wherein a plurality of bearing blocks (9), each fitted with a bearing, are mounted on the middle frame (2b) of the middle frame assembly (2) to support the oscillatory motion of the top frame assembly (3),
    wherein the top frame assembly (3) is constructed with one or more trusses (3a) fitted with a plurality of C-frames (3b) and are detachably mounted on tubular longitudinal member (3c),
    wherein a drive coupling flange (10) is fitted at the drive end of the tubular longitudinal member (3c) to drivingly connect the top frame assembly (3) to the one or more second slewing drives (11),
    wherein the top frame assembly (3) supports the photovoltaic (PV) panels and wherein the motors of the first slewing drive (4) and one or more second slewing drives (11) are connected to a control arrangement to provide required oscillatory movement to the middle frame assembly (2) and the top frame assembly (3) carrying the photovoltaic (PV) panels.

2. The dual axis solar panel tracking complete mechanical arrangement as claimed in claim 1, wherein the bush bearings (5) are split type construction and made of a material selected from bronze or Phosphor bronze.

3. The dual axis solar panel tracking complete mechanical arrangement as claimed in claim 1, wherein the bush bearings (5) are provided with one or more radial holes through which a lubricant is applied.

4. The dual axis solar panel tracking complete mechanical arrangement as claimed in claim 1, wherein the bush bearings (5) are separated by one or more spacer ring (6).

5. The dual axis solar panel tracking complete mechanical arrangement as claimed in claim 1, wherein flange (1d) of the base vertical tube (1b) as well as mounting flange (2d) of the middle frame assembly (2) are provided with radial fixing holes for fixing the first slewing drive (4).

6. The dual axis solar panel tracking complete mechanical arrangement as claimed in claim 1, wherein the middle frame (2b) is made of a steel beam having an I-shaped cross section.

7. The dual axis solar panel tracking complete mechanical arrangement as claimed in claim 1, wherein the bearing blocks (9) have a split type construction and are fitted with a bearing made of an antifriction material.

8. The dual axis solar panel tracking complete mechanical arrangement as claimed in claim 1, wherein the one or more second slewing drives (11) are mounted on a drive bracket (12) which is detachably fitted at least at one of the outer ends of the middle frame (2).

9. A dual axis solar panel tracking complete mechanical arrangement comprising:
    a base frame assembly (1);
    a middle frame assembly (2) wherein the middle frame (2b) is made of a steel beam having an I-shaped cross section;
    a top frame assembly (3);
    one or more photovoltaic (PV) panels;
    a first slewing drive (4); and
    one or more second slewing drives (11);
    wherein the base frame assembly (1) comprises a base plate (1a) fitted with a base vertical tube (1b), wherein one or more bush bearings (5) are fitted to the base vertical tube (1b) for the distribution of the radial load of the structure comprising the photovoltaic (PV) panels mounted on the top frame assembly (3) fitted to the middle frame assembly (2), wherein the upper end of the base vertical tube (1b) is closed by a thrust bearing mounting plate (7) to mount a thrust bearing (8) to transmit the entire axial load of the structure comprising the photovoltaic (PV) panels mounted on the top frame assembly (3) fitted to the middle frame assembly (2), wherein the middle frame assembly (2) comprises a tube assembly (2a) having tube (2a1) with inside diameter providing a sliding fit with the bush bearings (5) mounted on the base vertical tube (1b), wherein the upper end of the tube (2a1) is closed by a steel plate (2a2), the bottom portion of which rests on the thrust bearing (8) on mounting of the middle frame assembly (2) on the base frame assembly (1), wherein a mounting flange (2d) is rigidly fitted at the lower end of the tube (2a1) to connect the middle frame assembly (2) with the first slewing drive (4) fitted on the base frame assembly (1) fitted with a flange (1d), wherein a plurality of bearing blocks (9), each fitted with a bearing, are mounted on the middle frame (2b) of the middle frame assembly (2) to support the oscillatory motion of the top frame assembly (3), wherein the top frame assembly (3) is constructed with one or more trusses (3a) fitted with a plurality of C-frames (3b) and are detachably mounted on tubular longitudinal member (3c), wherein a drive coupling flange (10) is fitted at the drive end of the tubular longitudinal member (3c) to drivingly connect the top frame assembly (3) to the one or more second slewing drives (11), wherein the top frame assembly (3) supports the photovoltaic (PV) panels and wherein the motors of the first daily movement slewing drive (4) and the one or more second slewing drives (11) are connected to a control arrangement to provide required oscillatory movement to the middle frame assembly (2) and the top frame assembly (3) carrying the photovoltaic (PV) panels.

10. The dual axis solar panel tracking complete mechanical arrangement as claimed in claim 9, wherein the bush bearings (5) are split type construction and made of a material selected from bronze or Phosphor bronze.

11. The dual axis solar panel tracking complete mechanical arrangement as claimed in claim 9, wherein the bush bearings (5) are provided with one or more radial holes through which a lubricant is applied.

12. The dual axis solar panel tracking complete mechanical arrangement as claimed in claim 9, wherein the bush bearings (5) are separated by one or more spacer ring (6).

13. The dual axis solar panel tracking complete mechanical arrangement as claimed in claim 9, wherein flange (1d) of the base vertical tube (1b) as well as mounting flange (2d) of the middle frame assembly (2) are provided with radial fixing holes for fixing the first slewing drive (4).

14. The dual axis solar panel tracking complete mechanical arrangement as claimed in claim 9, wherein the bearing blocks (9) have a split type construction and are fitted with a bearing made of an antifriction material.

15. The dual axis solar panel tracking complete mechanical arrangement as claimed in claim 9, wherein the one or more second slewing drives (11) are mounted on a drive bracket (12) which is detachably fitted at least at one of the outer ends of the middle frame (2).

\* \* \* \* \*